March 1, 1966     J. E. BACLAWSKI     3,238,401
DYNAMOELECTRIC MACHINE
Filed Dec. 17, 1962
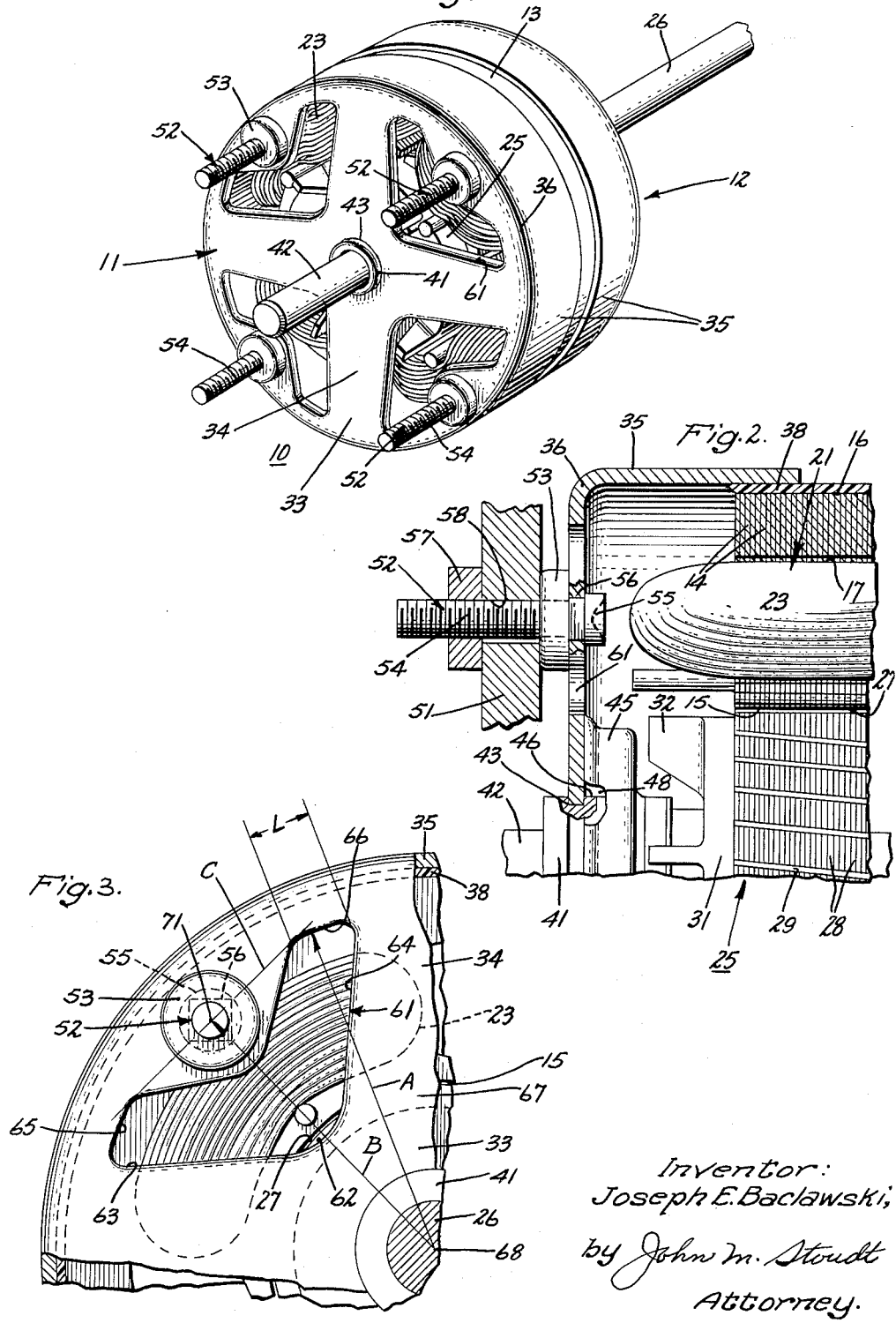
Inventor:
Joseph E. Baclawski,
by John M. Stoudt
Attorney.

ized out of sheet metal material of relatively thin cross section for supporting the bearings. In addition, the end shields normally include an arrangement for attaching the motor to a stationary structure by the use of untoleranced openings in such structure to provide further economies. For instance, in one type of motor application, certain humidifiers and other air moving equipment, the motor is supported at only one end with the axis of the shaft being horizontally maintained. A number of axially spaced apart bolts are fastened at one end to the end shield and at the other end project through suitable openings in the stationary structure for securing the motor in place.

United States Patent Office 3,238,401
Patented Mar. 1, 1966

3,238,401
DYNAMOELECTRIC MACHINE
Joseph E. Baclawski, Fort Wayne, Ind., assignor to General Electric Company, a corporation of New York
Filed Dec. 17, 1962, Ser. No. 245,211
7 Claims. (Cl. 310—91)

This invention relates to dynamoelectric machines in general and more particularly to an improved arrangement in such machines for reducing the magnitude of the mounting stresses transmitted from the mount to the bearing support.

One common form of machine is the small horsepower motor type having a stator and rotor secured to a shaft which is rotatably supported by a pair of sleeve type bearings usually secured to end shields by a stacked connection or the like. Since an important factor directly affecting performance of the motor; i.e., motor efficiency and bearing longevity, is the degree of interference experienced between the rotor shaft and the bearings, manufacturing procedures include fabrication steps which attempt to provide proper alignment of the bearings and the shaft and add to the overall expense of producing the motors.

In an effort to maintain manufacturing cost at a minimum, these motors generally employ end shields economically stamped out of sheet metal material of relatively thin cross section for supporting the bearings. In addition, the end shields normally include an arrangement for attaching the motor to a stationary structure by the use of untoleranced openings in such structure to provide further economies. For instance, in one type of motor application, certain humidifiers and other air moving equipment, the motor is supported at only one end with the axis of the shaft being horizontally maintained. A number of axially spaced apart bolts are fastened at one end to the end shield and at the other end project through suitable openings in the stationary structure for securing the motor in place.

Although this general approach is extremely desirable from the standpoint of manufacturing and installation costs, a practical difficulty has been encountered in providing a mounting arrangement which not only includes the requisite high degree of rigidity needed to support the motor, but also is effective to prevent the undesirable transmission of mounting stresses, created during securement of the motor to the supporting structure, from the mounting bolts through the sheet metal end shield to the place of bearing support. It has been found, for example, that tightening of the bolts onto the stationary structure may cause distortion of the end shield which in turn may transmit stresses to the bearing support of such magnitude that the bearing is caused to turn or to cock, thereby destroying the alignment of parts achieved during the previous steps of fabrication. In some cases, the misalignment between the bearings and the shaft is so great that the shaft actually binds with the bearings and the rotor is prevented from rotating at all with a resultant overheating of the windings and ultimate failure of the motor. The interposition of resilient bushings or grommets between the bolts and the supporting structure has not appreciably reduced the transmission of mounting stresses to the bearing.

Consequently, it will be appreciated from the foregoing that it is extremely desirable to provide an improved end shield construction, capable of reducing and effectively isolating stresses, introduced during mounting of the motor onto a stationary structure, from the shaft carrying bearings. It is also desirable that this improved construction be accomplished while retaining economy in the fabrication of the motor and without requiring an increase in the number of component parts necessary for mounting the motor. Further, the economy of construction should not result in a sacrifice of rigidity in the motor support or detrimentally affect the alignment of the component parts of the motor.

Accordingly, it is a general object of this invention to provide an improved mounting arrangement for a dynamoelectric machine, and it is a more specific object to achieve the desirable features set out directly above.

It is a further object of this invention to provide an improved mounting arrangement for an electric motor which effectively prevents the transmission of mounting stresses to the motor bearings as the motor is being attached onto a supporting structure, and yet permits economy and flexibility in the fabrication of the motor itself.

It is yet another object of the present invention to provide an improved yet relatively inexpensive arrangement for reducing the transmission of mounting stresses to the bearing support without necessitating an increase in the number of mounting components required to provide a rigid mount.

It is yet another object of this invention to provide an improved electric motor end shield assembly having a bearing which has a wall section stamped from sheet metal material, is of simple construction and inexpensive to manufacture and has means to reduce effectively the introduction of mounting stresses in the vicinity of the bearing.

In carrying out the objects in one form thereof, I provide an improved motor mounting arrangement for effectively reducing the magnitude of the mounting stresses transmitted from mounting bolts, attached to a wall section of a motor end shield, to the bearings carried by the wall section inwardly of the bolts. The wall section, formed of sheet material and terminating in a curved portion outward of the bolts, includes generally U-shaped slots provided adjacent each mounting bolt, with the bight of each slot being disposed between the respective bolts and the bearing, and with the slot legs extending on either side of the bolt, terminating in the vicinity of the curved portion of the end shield. The slot legs project at least up to a line drawn perpendicular to a radial line passing from the bearing axis to the center of the mounting bolts. In other words, the slot terminations of the legs are a greater linear distance away from the bearing axis than is the center of the mounting bolt associated therewith. With this construction, the slots, which may be economically stamped into the end shield, tend to prevent the transmission of mounting stresses from the bolts to the bearing without adversely affecting either the bearing alignment or rigidity of the mounting. These slots also act as entrances for the introduction of cooling fluid into the interior of the motor for cooling purposes, and permit the removal of rotor-stator aligning shims during fabrication of the motor, if used.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a view in perspective of an electric motor incorporating the preferred form of the present invention;

FIG. 2 is an enlarged sectional side view of a part of the electric motor illustrated in FIG. 1; and FIG. 3 is an enlarged end view of a portion of the end shield assembly of the motor seen in FIG. 1, showing the relationship of the component parts of the assembly to illustrate certain aspects of the invention more clearly.

Referring now to the drawing in more detail, for purposes of disclosure the preferred form of the present invention is shown as being applied to a small or fractional horsepower induction electric motor 10 having a pair of end shield assemblies 11 and 12 suitably secured to the outer surface of a stator 13. More specifically, the illustrated stator is conventionally formed with a magnetic core provided by a stacked plurality of laminations 14, the core having a rotor receiving bore 15 and a cylindrical outer periphery 16. As seen in FIG. 2, the stator core also includes a number of winding accommodating slots 17 provided in the customary fashion around the rotor receiving bore 15. These slots carry an excitation winding 21 formed by a number of coils wound of turns of enameled wire in the usual way. The coil sides of the winding are received within the slots, and coil end turns 23 project axially beyond each side face of the core.

A rotor 25, affixed onto a shaft 26 for relative rotation with the stator bore to provide an annular air gap 27, is illustrated as being of the squirrel cage type, and as such, includes a plurality of laminations 28 having a number of non-magnetic bars 29 electrically short-circuited at each end of the rotor by a cast end ring 31. In addition, to promote the circulation of a cooling fluid internally of the motor and over the winding end turns, a plurality of fan blades 32 may be integrally cast angularly around the end rings.

Turning now to the specific description of the end shield assemblies, for reasons of simplicity and brevity, only end shield assembly 11 has been shown in detail, but it is understood that end shield assembly 12 may be of identical construction, if so desired. However, it will be apparent to those skilled in the art that only one of the end shield assemblies need incorporate my invention when the motor is mounted at only one end.

As shown, end shield assembly 11 includes a generally cup-shaped member 33 preferably stamped out of relatively thin sheet material, such as steel, and formed with a generally radial wall section 34 and an outer axially projecting substantially annular flange section 35, integrally joined together by a circular curved portion 36. The outermost edge of flange section 35 is in partial overlapping and spaced relation to the outer peripheral surface of stator core 13, and may be secured thereto by any suitable means, such as glue, cement, or the like indicated at 38. A sleeve bearing 41 of the sintered porous type for rotatably carrying end 42 of shaft 26 extends through member 33 and is firmly supported centrally of wall section 34 by a staked arrangement at an end of the bearing, indicated by numeral 43.

In order to supply the bearing journal surface with lubricant from time to time, a substantially cup-shaped member 45 is furnished at the other end of the bearing and may be secured to the interior surface of the end shield wall section 34 at a position radially outwardly from the outer longitudinal surface 46 of the bearing. Member 45 along with surface 46 of the bearing and a part of wall section 34 together form a lubricant reservoir cavity surrounding the bearing. This cavity is substantially filled with lubricant retaining means, e.g., oil impregnated felt pad 48, which surrounds the bearing. Lubricant is fed from the reservoir to the bearing journal surface through the porous sintered body of the bearing.

For firmly mounting motor 10 onto a stationary supporting structure, such as depending wall 51 partially shown by reference 51 in FIG. 2 of a humidifier (not illustrated). four equally spaced apart (e.g., 90 degrees) identical mounting bolts or studs 52 are fixedly connected at one end to member 33. In the illustrated form, this connection is achieved between one side of an enlarged shoulder 53 provided at the base of threads 54 and a bolt head 55. Head 55 projects through holes 56 of square contour provided in wall 34 near curved portion 36 and is staked against the interior surface of wall section 34. To prevent turning or torsional movement of bolt 52 relative to member 33, the part of bolt 52 which is accommodated by hole 56 is of complementing square configuration. Nut 57 is employed on the threaded bolt part 54 which extends through untoleranced wall opening 58 to hold the other side of shoulder 53 in tight abutting relation with respect to depending wall 51. Although four mounting bolts have been employed, it should be recognized that under normal load conditions such as encountered in appliance applications, two or more diametrically disposed bolts could as easily have been used for mounting purposes, while retaining the other enumerated advantages of the present invention.

By the preferred form of the present invention, I provide wall section 34 with a generally U or V shaped stress relieving slot 61 in association with each mounting bolt 52. These slots may be advantageously stamped out of member 33 when it is being formed into the shape shown and the other openings; i.e., bearing and bolt holes, are being provided. Each slot has its bight portion 62 disposed inwardly of bolt shoulder 53 and radially outward of bearing 41 and its surrounding lubricant reservoir. Preferably, bight portion 62 is in axial register with air gap 27 to permit removal of stator-rotor aligning shims (not shown) from the air gap, if they are used during fabrication of the motor. Slot legs 63 and 64 extend on either side of the bolt and terminate in edges 65, 66 of identical construction having rounded corners for simplicity in mass production manufacture.

As seen in FIG. 3, for best results and to insure a very minimum of mounting stress transfer to the bearing through radial rib portions 67 of wall section 34, for the greater part of their total width or circumferential length L edges 65 and 66 are each formed as segments of a circle circumscribed by a radius having the bearing axis as a center, shown at 68. In addition, the radius or linear distance A from the bearing axis to edges 65, 66 should be greater than the linear distance B from the same axis to center 71 of the bolts. To state this another way, a part of edges 65, 66 should extend at least up to and intersect with a line C passing through bolt center 71 drawn perpendicular to B at that point. This arrangement provides sufficient material adjacent each bolt for supporting it and more than adequate slot space for permitting the unimpeded passage of cooling fluid therethrough during normal motor operation to cool the interior of the motor, e.g., motor winding end turns.

The ideal dimensional relationships of A, B, and the circumferential length L of edges 65, 66, to obtain the maximum benefit of my invention in any given motor, will of course be primarily dependent upon the cross section thickness and strength of the material used for member 33, as well as the total weight of the motor and running load thereof. In the circular motor of the preferred embodiment, I have determined that, as a general rule, the further away edges 65 and 66 are furnished from curved portion 36, the greater should be the minimum circumferential length L or width of the slot ends in order to isolate the mounting stresses in an effective manner. Of course, the proximity of the edges to the curved portion is limited, as a practical matter, by burrs or the like resulting from the punching operation, which occur at the edges of the punched out pieces of member 33, and other obvious manufacturing considerations.

The following example is given in order to show more clearly how the preferred form of the present invention, as described above, has been satisfactorily carried forth in actual practice. A number of electric motors were built in accordance with the construction revealed by the drawing and for purposes of identification, the same numerals used in the drawing also refer to the corresponding components of the example motor. These motors, weighting three pounds, fourteen ounces and rated at $\frac{1}{15}$ horsepower, included the following nominal dimensions:

Stator core length (stack length) _____ 1.75 inches.
Outer peripheral diameter of stator core__ 3.200 inches.
Bore 15 diameter _____ 1.775 inches.
Material for member 33 _____ Sheet steel.
Cross section thickness of member 33 ____ 0.060 inch.

Axial length of flange section 35 _____ 0.093 inch.
Internal diameter of flange section 35 ____ 3.235 inches.
Diameter of wall section 34 _____ 3.223 inches.
    $A = 1.48$ inches
    $B = 1.40$ inches
    $L = 0.295$ inch (segmental portion of
        $L = .175$ inch)
Rotor diameter _____ 1.752 inches.
Bolt thread 54 diameter _____ 0.190 inch.

Even when these motors were mounted to a stationary support by only one end shield assembly, no interference between the bearings and shaft was observed as a result of stresses which otherwise could have been introduced at the bolts and transmitted to the bearings through the end shields when the nuts were being tightened. Further, the mounting was extremely rigid and found to be quite satisfactory by actual test. These features were obtained, in addition to the aforementioned enlarged area for cooling fluid passage, shim removal, and cost advantages.

It should be apparent to those skilled in the art, that while I have shown and described what at present is considered to be the preferred embodiment of my invention in accordance with the patent statutes, changes may be made in the disclosed method without actually departing from the true spirit and scope of this invention, and I therefore intend to cover in the following claims all such equivalent variations as fall within the invention.

What I claim as new and desire to secure by Letters Patent of the United States is:

1. A dynamoelectric machine comprising a shaft, a rotor secured to said shaft for rotation therewith, and a stationary assembly including a stator provided with a bore for receiving the rotor and at least one end member having a wall section formed of sheet material supporting a bearing for rotatably carrying said shaft, said rotor and stator having an air gap therebetween, said wall section formed with a plurality of means arranged radially beyond the bearing and adapted to mount the machine onto a supporting structure, said wall section further including a generally U-shaped slot disposed between the bearing and each machine mounting means, the bight portion of each slot being arranged in axial register with the air gap to permit removal of rotor-stator aligning shims from the air gap during fabrication of the dynamoelectric machine, the ends of each slot respectively extending on either side of the mounting means associated therewith to a location near a line drawn through the center of the mounting means and perpendicular to a radial line passing from the bearing axis through the mounting means center whereby said slots tend to prevent the transmission of stresses from the mounting means to the bearing in said frame.

2. A dynamoelectric machine comprising a shaft, a rotor secured to said shaft to rotate therewith, and a stationary assembly including a stator provided with a bore for receiving the rotor and a frame formed with at least one end member having a wall section formed of sheet material supporting a bearing for rotatably carrying said shaft, said wall section including a plurality of means arranged radially beyond the bearing adapted to mount the machine onto a supporting structure, said wall section further including a generally U-shaped slot disposed between each machine mounting means and the bearing with the bight portion of the slot being arranged in axial register with the air gap to permit removal of rotor-stator aligning shims from the air gap during fabrication of the dynamoelectric machine, the ends of the slot respectively extending on either side of the mounting means associated therewith, the terminal edges of the slot ends having a greater linear distance from the bearing axis than the linear distance from the center of the mounting means to the same axis, said slots tending to prevent the transmission of stresses from the mounting means to the bearing and providing openings in the frame for the introduction of a cooling fluid into the interior of the dynamoelectric machine for cooling purposes.

3. For use in a dynamoelectric machine, an end frame assembly comprising a member formed with a wall section of sheet material supporting a bearing and having means arranged radially beyond the bearing adapted to mount the end frame onto a supporting structure, said member including at least one slot disposed between the bearing and the mounting means, the ends of the slot extending on either side of the mounting means to a location near a line drawn through the center of the mounting means and perpendicular to a radial line passing through the mounting means center whereby said slot tends to prevent the transmission of stresses from the mounting means to the bearing.

4. For use in a dynamoelectric machine, an end shield assembly comprising a member of relatively thin sheet material formed with a wall section supporting a bearing and with a curved portion at the outer edge of said wall section, said wall section having at least two mounting bolts arranged radially beyond the bearing adapted to attach the end frame to a supporting structure and including a generally U-shaped slot associated with each mounting bolt, each slot having the bight portion disposed between the bearing and the mounting bolt with the legs of the slot extending on either side of the mounting bolt and terminating adjacent said curved portion in the vicinity of a line drawn through the center of the bolt and perpendicular to a radial line passing through the center, said slot tending to reduce the transmission of stresses from the mounting means to the bearing and to permit the passage of cooling fluid through the end shield assembly into the machine.

5. For use in a dynamoelectric machine, an end frame assembly comprising a member of relatively thin cross section sheet material formed with a wall section supporting a bearing and having a plurality of means arranged radially beyond the bearing adapted to mount the end frame to a supporting structure, said wall section of the member including a generally U-shaped slot having a bight portion disposed between the bearing and each mounting means, with the legs of the slot extending on either side of the mounting means, the respective terminal edges of said slot legs extending at least up to a line drawn through the center of the mounting means associated therewith and perpendicular to a radial line passing through the center such that the slot tends to prevent the transmission of stresses from the associated mounting means to the bearing.

6. For use in a dynamoelectric machine, an end frame assembly comprising a member of relatively thin cross section sheet material formed with a wall section supporting a bearing and a plurality of means arranged radially outward from the bearing adapted to mount the end frame assembly onto a supporting structure, said wall section terminating in a generally circular curved portion outwardly of the mounting means with its ends extending on either side of the mounting means, the edges of said slot ends being a segment of a circle lying adjacent said curved portion and having a center concentric with the axis of the bearing such that the radius of the segment is dimensionally greater than the linear distance from the bearing axis to the center of the mounting means, said slot tending to minimize the transmission of stresses from the mounting means to the bearing.

7. For use in a dynamoelectric machine, an end shield assembly comprising a generally cup-shaped relatively thin sheet metal member formed by a radial wall section terminating in a curved portion and an axially extending flanged section, a sleeve type bearing firmly supported by said radial wall section, a plurality of angularly spaced mounting bolts rigidly connected to said radial wall section outwardly of said bearing and adjacent said curved portion, said bolts having means adapted to mount the motor to a stationary support, said radially extending wall section further including generally U-shaped slots corresponding in number to the bolts with the bight of each slot being disposed between the bearing and the mounting bolt and a leg of each slot projecting in the vicinity of the curved portion on either side of the mounting bolt, the terminal edge of each leg extending at least up to a line drawn through the center of the bolt and perpendicular to a radial line passing through the bolt center, said slots tending to isolate from the bearing stresses introduced into the end shield by said bolts as the machine is being mounted onto the stationary support.

References Cited by the Examiner
UNITED STATES PATENTS

| | | | |
|---|---|---|---|
| 669,573 | 3/1901 | Bliss | 310—254 |
| 1,130,211 | 3/1915 | Starker | 310—254 |
| 1,919,540 | 7/1933 | Wulfert | 310—42 XR |
| 2,075,893 | 4/1937 | Farrand | 171—252 |
| 2,792,512 | 3/1957 | Koch | 310—252 |
| 3,021,442 | 2/1962 | Rodak | 310—89 X |
| 3,114,060 | 12/1963 | Goettl | 310—51 |

ORIS L. RADER, *Primary Examiner.*

MILTON O. HIRSHFIELD, *Examiner.*

J. J. SWARTZ, *Assistant Examiner.*